United States Patent
Zeng

(10) Patent No.: US 11,704,629 B2
(45) Date of Patent: Jul. 18, 2023

(54) METHODS AND DEVICES FOR PROCESSING INFORMATION CARD

(71) Applicant: BANMA ZHIXING NETWORK (HONGKONG) CO., LIMITED, Grand Cayman (KY)

(72) Inventor: Zhonghua Zeng, Hangzhou (CN)

(73) Assignee: BANMA ZHIXING NETWORK (HONGKONG) CO., LIMITED, Kowloon (HK)

( * ) Notice: Subject to any disclaimer, the term of this patent is extended or adjusted under 35 U.S.C. 154(b) by 821 days.

(21) Appl. No.: 15/005,867

(22) Filed: Jan. 25, 2016

(65) Prior Publication Data

US 2016/0217360 A1    Jul. 28, 2016

(30) Foreign Application Priority Data

Jan. 27, 2015   (CN) .......................... 201510039432.8

(51) Int. Cl.
  *G06Q 10/02*    (2012.01)
  *G06Q 10/109*   (2023.01)
(52) U.S. Cl.
  CPC ........... *G06Q 10/109* (2013.01); *G06Q 10/02* (2013.01)
(58) Field of Classification Search
  CPC ...... G06Q 10/109; G06Q 10/02; G06Q 20/36; G06Q 20/351; G06Q 20/204; G06Q 30/0641
  See application file for complete search history.

(56) References Cited

U.S. PATENT DOCUMENTS

| | | | |
|---|---|---|---|
| 8,196,131 B1 | 6/2012 | von Behren et al. | |
| 8,401,904 B1* | 3/2013 | Simakov | G06Q 20/3572 705/16 |
| 8,646,059 B1 | 2/2014 | von Behren et al. | |
| 10,121,141 B1* | 11/2018 | Belleville | G06Q 20/3672 |
| 10,261,672 B1* | 4/2019 | Dolbakian | G06F 3/04842 |

(Continued)

FOREIGN PATENT DOCUMENTS

| | | |
|---|---|---|
| CN | 101454794 A | 6/2009 |
| CN | 101990169 A | 3/2011 |

(Continued)

OTHER PUBLICATIONS

PCT Search Report and Written Opinion dated May 6, 2016 for PCT Application No. PCT/US16/14761, 9 pages.

(Continued)

*Primary Examiner* — Daniel I Walsh
(74) *Attorney, Agent, or Firm* — Lee & Hayes, P.C.

(57) ABSTRACT

Methods and systems for processing information cards. The implementations include receiving from a first application an instruction by a second application to process the information card. The first application is different from an application corresponding to the information card, and the second application is capable of processing the information card. The second application may process the information card based on the instruction. Alternatively, the second application may return service data to the first application based on the instruction such that the first application processes the information card based on the service data. This improves flexibility and efficiency of information card processing.

20 Claims, 9 Drawing Sheets

(56) References Cited

U.S. PATENT DOCUMENTS

| | | | | |
|---|---|---|---|---|
| 10,262,481 | B2* | 4/2019 | Saravanan | G07C 9/00103 |
| 11,159,641 | B2* | 10/2021 | Zeng | H04W 4/80 |
| 2003/0090708 | A1* | 5/2003 | Dennison | G06F 3/1284 |
| | | | | 358/1.15 |
| 2007/0254712 | A1* | 11/2007 | Chitti | G06Q 20/045 |
| | | | | 455/558 |
| 2010/0082491 | A1 | 4/2010 | Rosenblatt et al. | |
| 2010/0094686 | A1* | 4/2010 | Henshaw | G06Q 30/0252 |
| | | | | 725/13 |
| 2010/0260388 | A1* | 10/2010 | Garrett | G06Q 20/22 |
| | | | | 382/124 |
| 2012/0185796 | A1* | 7/2012 | Tanaka | G06F 9/543 |
| | | | | 715/781 |
| 2013/0191227 | A1* | 7/2013 | Pasa | G06Q 20/3674 |
| | | | | 705/14.73 |
| 2014/0047331 | A1* | 2/2014 | Feldman | H04L 67/10 |
| | | | | 715/273 |
| 2014/0074696 | A1* | 3/2014 | Glaser | G06K 19/00 |
| | | | | 705/39 |
| 2014/0074704 | A1* | 3/2014 | White | G06Q 20/353 |
| | | | | 705/41 |
| 2014/0180880 | A1* | 6/2014 | Godsey | G06Q 30/0641 |
| | | | | 705/27.1 |
| 2014/0207682 | A1* | 7/2014 | Wolfond | G06Q 20/027 |
| | | | | 705/44 |
| 2014/0214640 | A1* | 7/2014 | Mallikarjunan | G06Q 20/36 |
| | | | | 705/35 |
| 2014/0372298 | A1* | 12/2014 | Singh | G06Q 20/3278 |
| | | | | 705/41 |
| 2015/0269625 | A1* | 9/2015 | Campbell | G06Q 30/0267 |
| | | | | 705/14.64 |
| 2016/0071074 | A1* | 3/2016 | Baird | G06Q 20/102 |
| | | | | 705/40 |
| 2016/0103594 | A1* | 4/2016 | Greenberg | G06F 40/106 |
| | | | | 715/255 |
| 2016/0132930 | A1* | 5/2016 | Handly | H04W 4/80 |
| | | | | 705/14.58 |
| 2016/0217360 | A1* | 7/2016 | Zeng | G06Q 10/109 |
| 2016/0226997 | A1* | 8/2016 | Zeng | H04L 67/60 |
| 2016/0260084 | A1* | 9/2016 | Main | G06Q 20/3674 |
| 2016/0260090 | A1* | 9/2016 | Healy | G06Q 20/326 |
| 2016/0321222 | A1* | 11/2016 | Greenberg | G06F 16/9577 |
| 2017/0098144 | A1* | 4/2017 | Gupta | G06K 19/042 |
| 2017/0161781 | A1* | 6/2017 | Parekh | G06Q 20/36 |
| 2017/0201708 | A1* | 7/2017 | Igarashi | H04N 23/63 |
| 2017/0331941 | A1* | 11/2017 | Zeng | H04M 1/72451 |
| 2018/0032997 | A1* | 2/2018 | Gordon | G06Q 30/0269 |
| 2018/0150920 | A1* | 5/2018 | Borucki | G06K 7/1417 |
| 2018/0240106 | A1* | 8/2018 | Garnett | G06Q 20/322 |
| 2019/0019179 | A1* | 1/2019 | Mtaza | G06Q 20/3674 |
| 2019/0065998 | A1* | 2/2019 | Xu | G06Q 40/04 |
| 2019/0205930 | A1* | 7/2019 | Kim-Whitty | G06V 40/161 |
| 2019/0236852 | A1* | 8/2019 | Ito | G06Q 20/04 |
| 2019/0377460 | A1* | 12/2019 | Butcher | G06N 3/088 |
| 2019/0378185 | A1* | 12/2019 | Ito | G06Q 10/06395 |
| 2020/0117690 | A1* | 4/2020 | Tran | G06Q 20/308 |
| 2020/0225901 | A1* | 7/2020 | Boissière | G06F 21/84 |
| 2020/0348144 | A1* | 11/2020 | Roth | G06Q 10/00 |
| 2020/0410391 | A1* | 12/2020 | Barrett | G06N 5/04 |
| 2021/0065156 | A1* | 3/2021 | Kadiwala | G06Q 20/363 |
| 2021/0271881 | A1* | 9/2021 | Traynor | G06V 40/20 |
| 2022/0343317 | A1* | 10/2022 | Zhang | G06Q 20/36 |

FOREIGN PATENT DOCUMENTS

| | | |
|---|---|---|
| CN | 102693071 A | 9/2012 |
| CN | 103853606 A | 6/2014 |

OTHER PUBLICATIONS

Machine Translation of second Chinese Office Action dated Mar. 1, 2019 for Chinese patent application No. 201510039432.8, a counterpart foreign application of U.S. Appl. No. 15/005,867, 5 pages.

Machine Translation of first Chinese Office Action dated Sep. 3, 2018 for Chinese patent application No. 201510039432.8, a counterpart foreign application of U.S. Appl. No. 15/005,867, in 14 pages.

The Chinese Search Report dated Aug. 23, 2018 for CN application No. 201510039432.8, 2 pages.

* cited by examiner

METHODS AND DEVICES FOR PROCESSING INFORMATION CARD

CROSS REFERENCE TO RELATED PATENT APPLICATIONS

This application claims priority to Chinese Patent Application No. 201510039432.8, filed on Jan. 27, 2015, entitled "Methods and Devices for Processing Information Card," which is hereby incorporated by reference in its entirety.

TECHNICAL FIELD

The present disclosure relates to software and, more specifically, to methods and devices for processing information cards.

BACKGROUND

With the development of the Internet and mobile technologies, various types of applications have been developed. For example, an application corresponding to an information card refers to an application capable of managing the information card. Examples of information cards include boarding passes, membership cards, movie tickets, loyalty cards, gift cards and other electronic information cards. The application may connect with the Internet so as to timely and automatically update information of the information card. For example, the application may remind a user associated with the information card using a geographic information system when the user is close to a physical store associated with the information card.

In addition to applications corresponding to information cards, there are other applications capable of performing one or more operations on information cards. But an information card can only be processed by switching to the application corresponding to the information card. This results in inflexibility and inefficiency of information card processing.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

Implementations of the present disclosure relate to methods and systems for processing information cards. The implementations improve flexibility and efficiency of information card processing.

The implementations relate to a method including receiving from a first application an instruction by a second application to process the information card. The first application is different from an application corresponding to the information card, and the second application is capable of processing the information card. The second application may process the information card based on the instruction or return service data to the first application based on the instruction such that the first application may process the information card based on the service data.

The implementations relate to another method including receiving by the first application a triggering event for processing the information card. The first application is different from an application corresponding to the information card, and the first application interacts with a second application to process the information card. The second application is capable of processing the information card.

The implementations relate to a device implementing one or more methods described above. The device includes a receiving module and a processing module. The receiving module may be configured to receive from a first application an instruction to process an information card. The first application is different from an application corresponding to the information card, and the second application is capable of processing the information card. The processing module may be configured to process the information card based on the instruction or return service data to the first application based on the instruction such that the first application may process the information card based on the service data.

The implementations relate to another device implementing one or more methods described above. The device may include a receiving module and a processing module. The receiving module may be configured to receive a triggering event for processing the information card at a first application. The first application is different from an application corresponding to the information card. The processing module may be configured to interact with a second application to process the information card. The second application is capable of processing the information card.

In implementations, when the first application is different from an application corresponding to the information card, the first application may transmit an instruction to the second application to process the information card. The second application may receive from the first application the instruction and process the information card based on the instruction. Alternatively, the second application may return service data to the first application based on the instruction such that the first application may process the information card based on the service data.

The implementations may process the information card under an environment of the first application without switching to the second application, which corresponds to the information card. This improves flexibility and efficiency of information card processing.

BRIEF DESCRIPTION OF THE DRAWINGS

The Detailed Description is described with reference to the accompanying figures. The use of the same reference numbers in different figures indicates similar or identical items.

DETAILED DESCRIPTION

The detailed description is described with reference to the accompanying figures and implementations. The drawings and related descriptions are not intended to limit the scope of the present disclosure.

Figure 1:
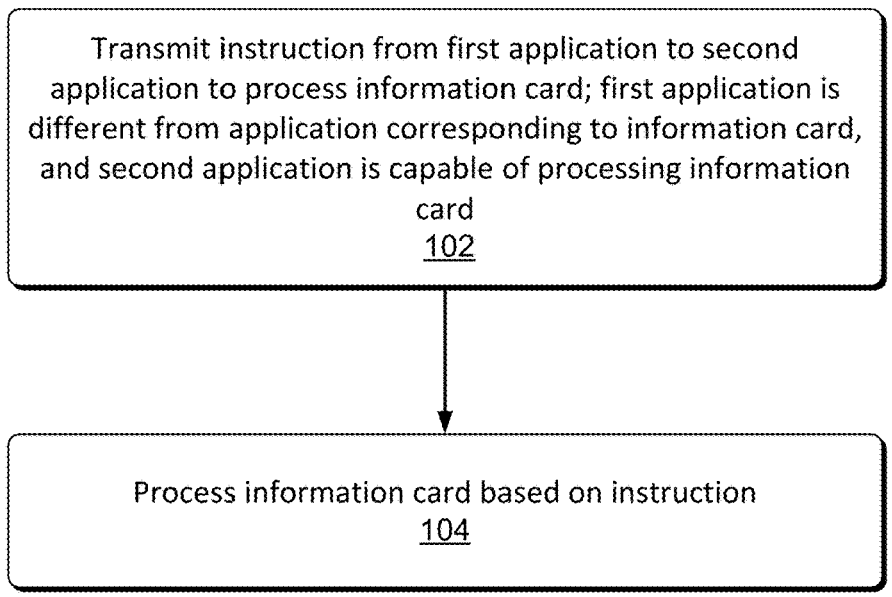
FIG. 1 is a flow chart of an illustrative process for processing information cards.

FIG. 1 is a flow chart of an illustrative process for processing information cards. At 102, a first application may transmit an instruction to a second application to process the information card. The first application is different from an application corresponding to the information card, and the second application is capable of processing the information card. At 104, the second application may process the information card based on the instruction.

These implementations relate to a method for processing information cards. The method may be implemented by the second application. The second application is capable of processing the information card.

An application corresponding to an information card refers to an application capable of managing electronic information cards. Information cards may include boarding passes, membership cards, movie tickets, loyalty cards, gift cards and other electronic information cards. The application may connect with the Internet such as to timely and automatically update information of the information cards. In implementations, the application may remind a user associated with the information card using geographic information systems when the user is close to a physical store associated with the information card.

For example, the application corresponding to an information card may include Google Now, Passbook, or other applications that may manage and/or control the information card on behalf of the user. The application may also be called a "life service center".

In implementations, the second application is the application corresponding to the information card or an application between the first application and another application corresponding to the information card. For example, the other application is capable of storing and managing information cards. The first application is different from an application corresponding to the information card, and may include an operating system or an application provided by a third party. For example, the first application may include a messaging application, a telephone application, an instant messaging application, a calendar application, a memo application, an email application etc.

The first application may also provide corresponding information cards for a user or an application. When the first application provides an information card, one or more functionalists of the first application may be called by an application corresponding to the information card.

In implementations, the first application may interact with the second application such that the first application transmits an instruction to the second application to instruct the second application to process the information card. Accordingly, the information card has been processed without switching from the first application to the second application, which corresponds to the information card. This improves flexibility and efficiency of information card processing.

The implementations relate to a method for processing an information card. When the first application is different from an application corresponding to the information card, the first application transmits an instruction to the second application to process the information card. The second application may process the information card based on the instruction.

The second application may process the information card using various operations such as a creating operation, an updating operation, a querying operation, and/or a deleting operation. The creating operation includes creating a new information card. The updating operation includes updating information of the information card. The querying operation includes querying or searching the information card. The deleting operation includes deleting the information card.

The implementation may include receiving from the first application an instruction by the second application to process the information card. The first application may transmit the instruction including processing information for processing the information card. The second application may provide an access interface for external visits to allow other application to call the access interface to process the information card. Accordingly, the first application may call the access interface of the second application to allow the first application to transmit to the second application processing information for processing the information card.

In implementations, the second application may receive the processing information from an access interface of the second application that is called by the first application. Further, the second application processes the information card based on the processing information.

In implementations, the processing information may include processing parameters associated with the processing of the information card. For example, the processing information includes a processing type associated with the processing of the information card. The processing type may be included in the processing information explicitly, and then transmitted to the second application. The processing type may also be transmitted in an implicit way to the second application.

The first application may provide the processing type and processing parameters to the second application. Further, the second application may process the information card with respect to the processing type based on the processing parameters. The processing type is mainly used to identify what needs to process the information card.

In implementations, the processing type is used to identify various operations on the information card such as a creating operation, an updating operation, a querying operation, a deleting operation etc. The processing parameters may include parameters used in one or more operations on the information card that are identified by the processing type.

For example, with respect to various processing types, the process parameters may include at least one of a card ID, card content, or a card title. Depending on a processing type for the information card, processing parameters may be different. For example, if the processing type of the information card includes a creating operation, the processing parameters may include a card ID, a card title, a service ID, and card content. In these instances, the service ID may identify of an implementation type the information card.

The first application may transmit the processing parameters for creating the information card to the second application by calling an access interface of the second application for external visits. The processing parameters may include the card ID, the card title, the card content, the service ID. The second application may create the information card based on the card ID, the card title, the service ID, and the card content.

After creating the information card, the second application may return the information card to the first application. The first application may further display the created information card in a current interface associated with the first application. Users may create the information card without switching from the first application to the second application.

If the processing type of the information card includes an updating operation, the processing parameters may include at least one of a card ID, a card title, a service ID, or card content. The first application may transmit the processing parameters for transmitting updated processing parameters to the second application by calling an access interface of the second application for external visits. The processing parameters may include the card ID, the card title, the card content, the service ID. The second application may update the information card based on the card ID, the card title, the service ID, and the card content and return the updated information card to the first application.

The first application may present the updated information card in the current interface of the first application. The users may update the information card without switching from the first application to the second application.

If the processing type of the information card includes a querying operation, the process parameters may include the card ID. The first application may transmit the processing parameters for transmitting the card ID for querying the information card to the second application by calling the access interface of the second application for external visits. The second application may search an information card corresponding to the card ID, and return the information card to the first application. The first application may present the information card in the current interface of the first application. The users may search and identify the information card without switching from the first application to the second application.

Implementations of the present disclosure also relate to controlling and presenting an information card in a current interface by the second application based on a corresponding processing type without returning the information card to the first application. In implementations, the second application may control the information card to be presented in the current interface of the first application.

If the processing type of the information card includes a deleting operation, the process parameters may include the card ID. The first application may transmit the processing parameters for transmitting the card ID for deleting the information card to the second application by calling the access interface of the second application for external visits. The second application may search and identify an information card corresponding to the card ID, and delete the information card. Further, the second application may return a notification message to notify the first application that the information card is successfully deleted. Accordingly, the users may delete the information card without switching from the first application to the second application.

In implementations, the second application may provide an access interface for external visits. For various processing types, the first application may call the access interface and transmit the processing type and processing parameters as entrance parameters to the second application. Accordingly, the second application may receive processing information via the access interface that is called by the first application. The first application may call an access interface to transmitting information to the second application. This is relatively easier to be implemented and has lower cost as compared to conventional techniques.

In implementations, the second application may provide multiple access interfaces for external visits. Each access interface corresponds to a processing type. The second application may process the information card using various operations such as a creating operation, an updating operation, a querying operation, and/or a deleting operation. The multiple access interfaces may include an access interface for creating operations (i.e., a creating access interface), an access interface for querying operations (i.e., a querying access interface), an access interface for updating operations (i.e., an updating access interface), and/or an access interface for deleting operations (i.e., a deleting access interface). Accordingly, the first application may call a corresponding access interface of the second application to allow the first application transmit to the second application processing parameters for processing the information card.

The second application may receive the processing parameters from the corresponding access interface of the second application that is called by the first application. In implementations, the second application may receive the processing parameters from the corresponding access interface of the second application that is called by the first application by implementing the following operations.

The second application may receive a card ID in the processing parameters from the access interface that is called by the first application and corresponds to the processing type of the information card. The second application may transmit a parameter input interface from the second application to the first application. The second application may receive other parameters in the processing parameters from the first application via the parameter input interface. In some implementations, when the processing type is a creating operation, the second application may receive the card ID in the processing parameters.

The second application may transmit an input interface parameter to the first application. The second application may receive other parameters in the processing parameters from the first application via the parameter input interface. The other parameters may include a card title, card content, and/or a service ID.

In implementations, when the processing type is a creating operation, the second application may process the information card based on processing information by the following operations. The second application may render the card title, the card title, and the card content based on a type resource corresponding to the service ID to generate an information card view and to create a background view. The second application may superimpose the information card view on the background view to obtain the information card corresponding to the card ID.

The second application may further transmit the information card corresponding to the card ID to the first application to allow the first application to present the information card in a current interface. Alternatively, the second application may present the information card corresponding to the card ID in the current interface of the first application. For instance, the background view may be in translucent state. The first application may generate an entrance area for the information card in the current interface such that a user may generate a triggering instruction via the entrance area for creating, updating, querying, and/or deleting the information card.

Figure 2:
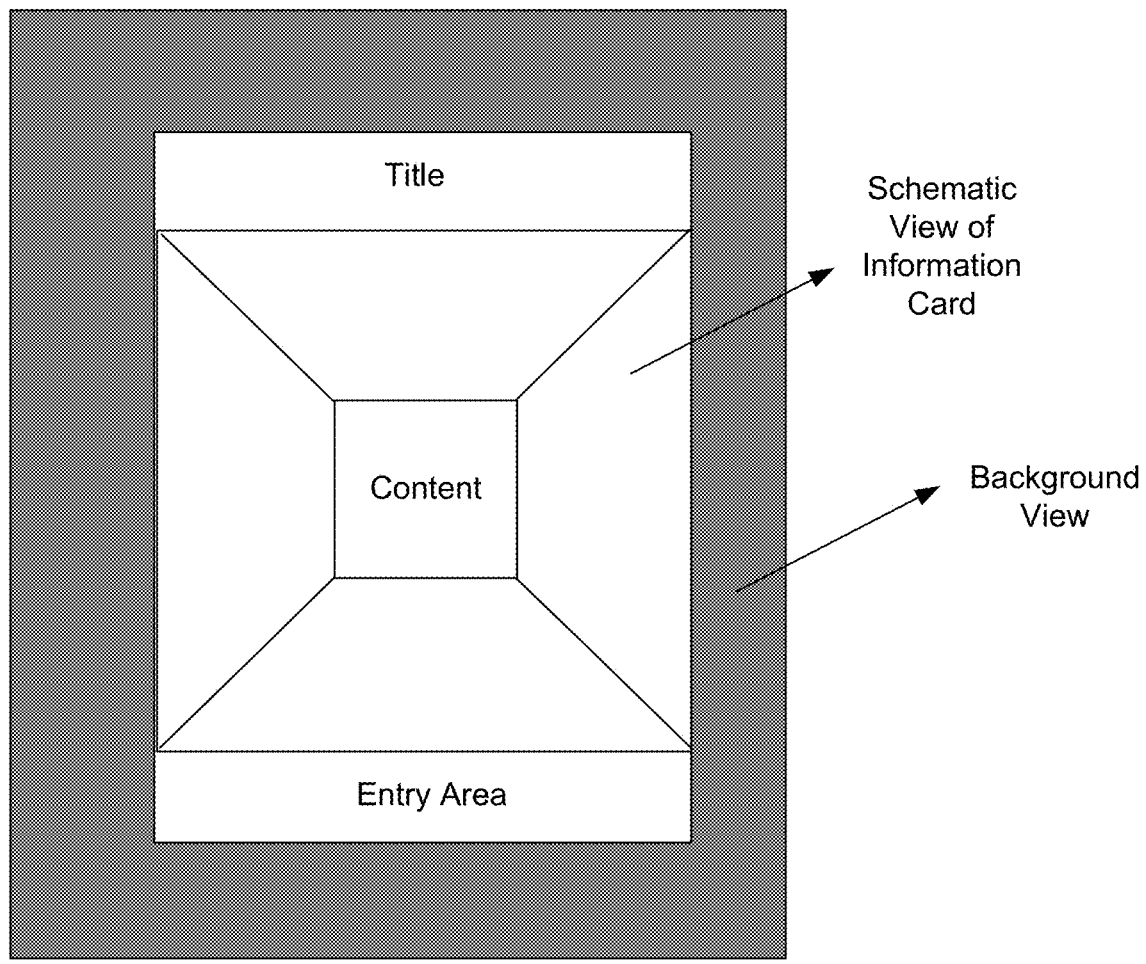
FIG. 2 is a schematic view of an information card created by a second application in accordance with an embodiment of the present disclosure.

FIG. 2 is a schematic view of an information card created by a second application in accordance with an embodiment of the present disclosure. In implementations, a first application may obtain processing information and provide to the second application. The second application may further process a corresponding information card based on the processing information that is transmitted from the first application. This approach reduces processing load on the second application.

In implementations, processing permissions of the first application for the card information may be controlled. For example, if a processing permission (e.g., querying permission) is allowed, a default instruction from the first application may include a querying operation on information cards. In these instances, there is no need for transmitting of a processing type and for a corresponding access interface.

The second application may receive from the first application an instruction to process the information card. For example, the second application may receive a notification message from the first application. The notification message is used to indicate a business event that is triggered by a third application bound to the information card and received by the first application. In other words, the second application may receive an instruction including a notification message that is transmitted by the first application after or when the first application receives the business event triggered by the third application bound to the information card;

Accordingly, the second application may process the information card based on the instruction. For example, the second application may acquire a processing logic based on the notification message, and acquire the processing information based on the processing logic. The second application may further process the information card based on the processing information.

The notification message may be a part of a standard message provided by an operating system, and applications supported by the operating system may receive and identify the notification message. The second application may receive and identify the notification message.

In implementations, the information card may be predetermined to be bound to a third application and the processing logic corresponding to the information card may be preset. Accordingly, after receiving the notification message, the second application may acquire form the first application a business event triggered by the third application and call the preset processing logic to process the information card.

After the first application receives the business event, the first application may broadcast the notification message without obtaining the processing information of the information card and providing the processing information to the second application. This simplifies the processing logic of the first application and reduces processing load on the second application.

In implementations, the processing information may include processing parameters associated with the processing of the information card and a processing type. Further, the second application may process the information card with respect to the processing type based on the processing parameters. Accordingly, when the first application is different from an application corresponding to the information card, the first application may transmit an instruction to the second application to process the information card. The second application may receive from the first application the instruction and process the information card based on the instruction.

The implementations may process the information card under an environment of the first application without switching to the second application, which corresponds to the information card. This improves flexibility and efficiency of information card processing.

Figure 3:
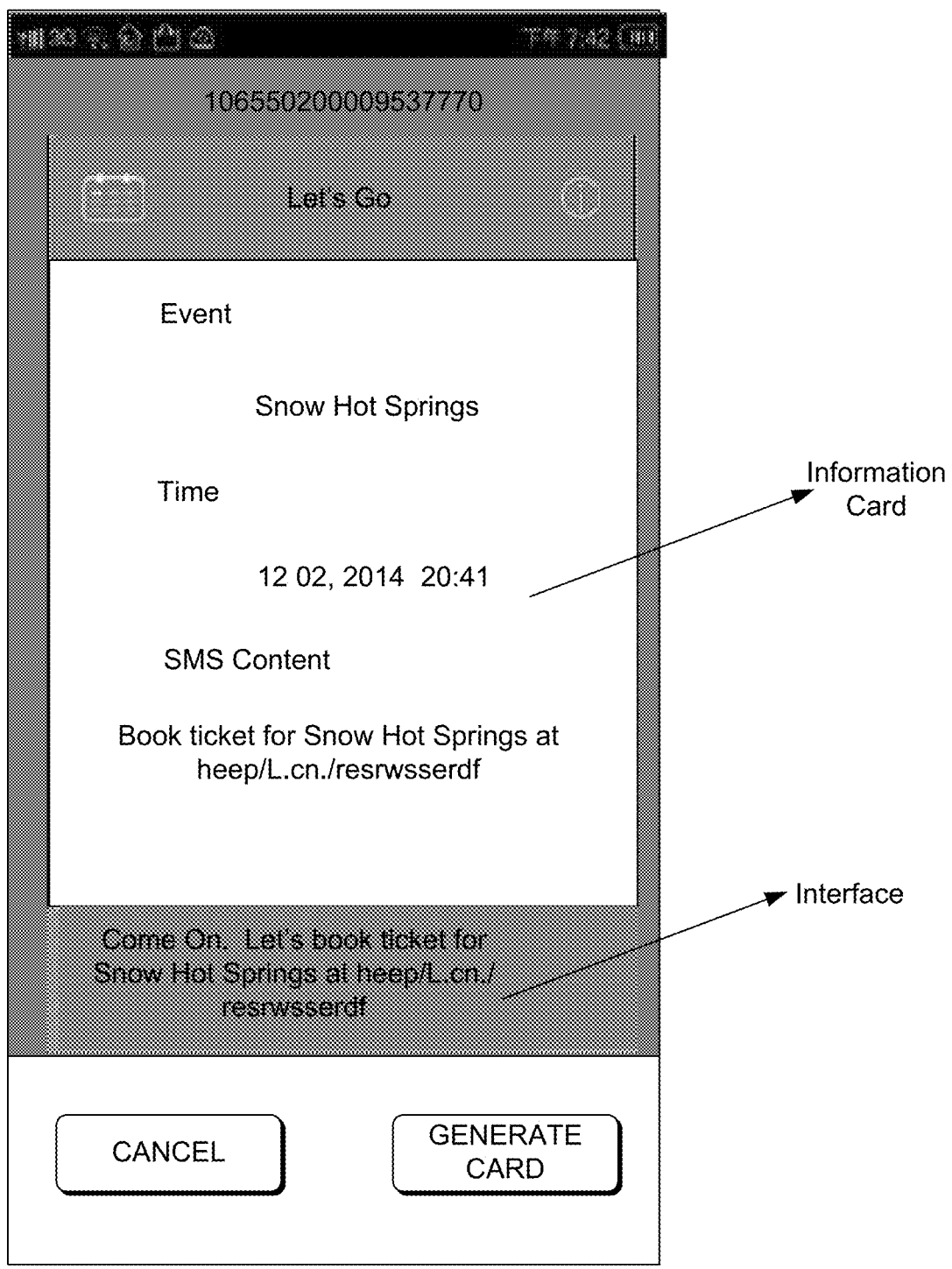
FIG. 3 is a schematic view of an information card created by a SMS application in accordance with an embodiment of the present disclosure.
Figure 4:
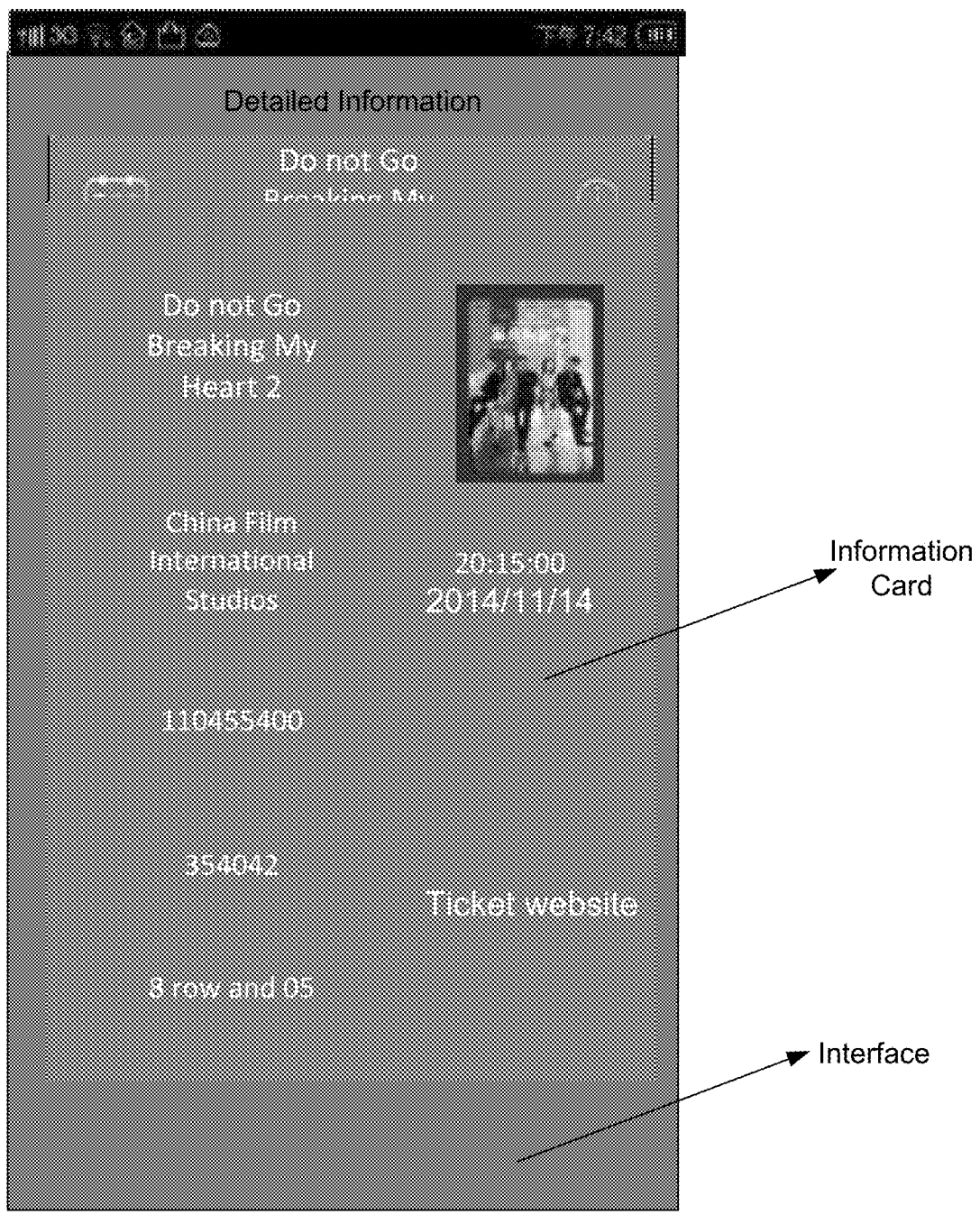
FIG. 4 is a schematic view of an information card queried by a calendar application in accordance with an embodiment of the present disclosure.
Figure 5:
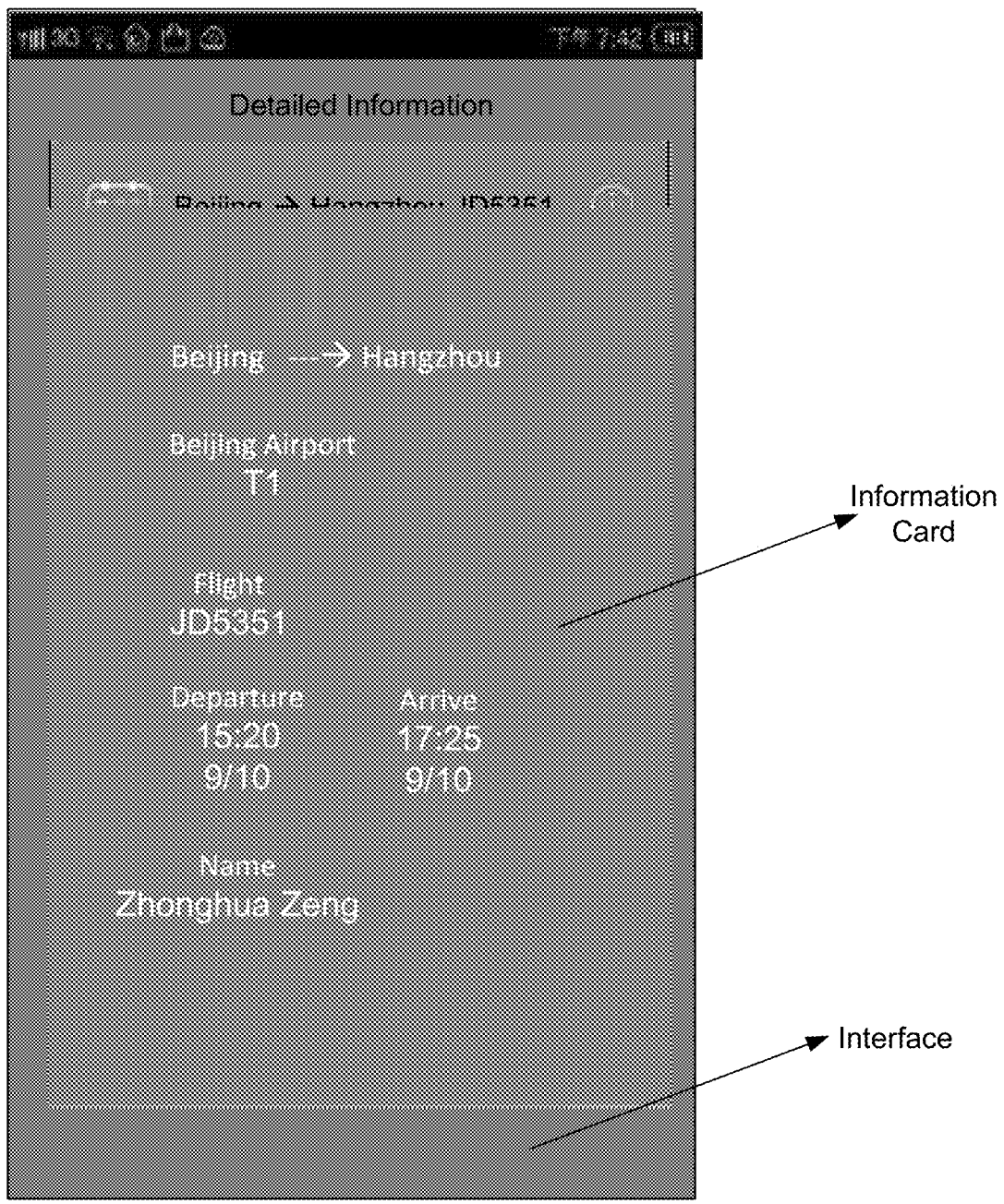
FIG. 5 is another schematic view of an information card queried by a calendar application in accordance with an embodiment of the present disclosure.

FIG. 3 is a schematic view of an information card created by a SMS application in accordance with an embodiment of the present disclosure. The information card may include a name of an event, a location of the event, and a time of the event. In addition, the implementations described above may be used to search various information cards using a calendar application. Examples of search results are provided in FIG. 4 and FIG. 5. FIG. 4 is a schematic view of movie information of "Do not Go Breaking My Heart 2" and FIG. 5 is a schematic view of flight information.

Figure 6:
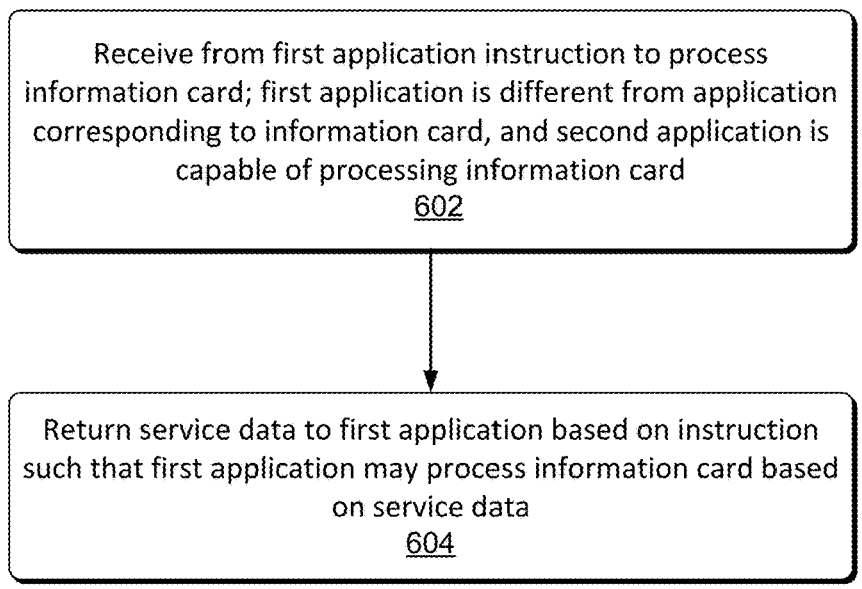
FIG. 6 is another flow chart of an illustrative process for processing information cards.

FIG. 6 is another flow chart of an illustrative process for processing information cards. At 602, a second application may receive from a first application an instruction to process the information card. The first application is different from an application corresponding to the information card, and the second application is capable of processing the information card. At 604, the second application may return service data to the first application based on the instruction such that the first application may process the information card based on the service data.

The implementations relate to a method for processing information cards. The method may be implemented by the second application, which is capable of processing the information card.

An application corresponding to an information card refers to an application capable of managing information cards. The information cards may include boarding passes, membership cards, movie tickets, loyalty cards, gift cards and other electronic information cards. The application may connect with the Internet such as to timely and automatically update information of the information cards. In some implementations, the application card may remind a user associated with the information cards using a geographic information system when the user is close to a physical store associated with the information cards.

For example, the application corresponding to an information card may include Google Now, Passbook, or other applications that may manage and/or control the information card on behalf of the user.

In implementations, the second application may correspond to the information card or is an application between the first application and another application corresponding to the information card. The other application is capable of storing and managing information cards. The first application is different from an application corresponding to the information card. For example, the first application may include an operating system or an application provided by a third party. For example, the first application may include a messaging application, a telephone application, an instant messaging application, a calendar application, a memo application, an email application etc.

In implementations, the first application may also provide corresponding information cards for a user or an application. When the first application provides an information card, one or more functionalists of the first application may be called by an application corresponding to the information card.

The first application may interact with the second application such that the first application transmits an instruction to the second application to instruct the second application to process the information card without switching from the first application to an application corresponding to the information card. This simplifies cross-application information processing and improves flexibility and efficiency of information card processing.

The implementations relate to a method for processing an information card. When the first application is different from an application corresponding to the information card, the first application transmits an instruction to the second application to process the information card.

The second application may return service data to the first application based on the instruction such that the first application may process the information card based on the service data. For instances, the service data includes a processing logic for processing the information card.

In implementations, the second application may transmit the processing logic for processing an information card to the first application such that the first application becomes capable of processing the information card and process the information card. In other words, the first application processes the information card based on service data; similarly, the second application processes the information card based on the processing information. These two processes are the same; the flow of processing the information card by the first application based on service data is omitted.

Depending on processing types for the information card, processing logics in the service data may be different. The first application may process the information card using various operations such as a creating operation, an updating operation, a querying operation, and/or a deleting operation. The creating operation includes creating a new information card. The updating operation includes updating information of the information card. The querying operation includes querying or searching the information card. The deleting operation includes deleting the information card. Accordingly, the service data may include process logics such as a creating logic for creating an information card, an updating logic for updating the information card, a querying logic for querying the information card, and/or a deleting logic for deleting the information card.

In implementations, when the first application is different from an application corresponding to the information card, the first application may transmit an instruction to the second application to process the information card. The second application may receive the instruction and return service data to the first application based on the instruction such that the first application may process the information card based on the service data.

Accordingly, the implementations may process the information card under an environment of the first application without switching to the second application, which corresponds to the information card. This improves flexibility and efficiency of information card processing.

Figure 7:
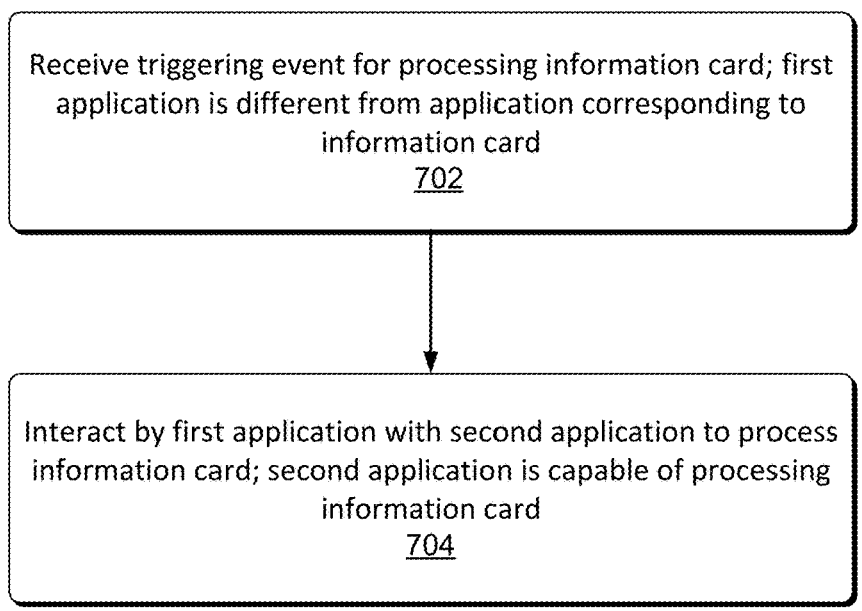
FIG. 7 is yet another flow chart of an illustrative process for processing information cards.

FIG. 7 is yet another flow chart of an illustrative process for processing information cards. At 702, a first application may receive a triggering event for processing the information card. The first application is different from an application corresponding to the information card. At 704, the first application may interact with a second application to process the information card. The second application is capable of processing the information card.

The implementations relate to a method for processing information cards. The method may be implemented by the first application. The second application is capable of processing an information card, and the first application is processing the information card. The first application is different from an application corresponding to the information card.

In implementations, the second application is the application corresponding to the information card or an application between the first application and another application corresponding to the information card.

An application corresponding to an information card refers to an application capable of managing information cards. The information cards may include boarding passes, membership cards, movie tickets, loyalty cards, gift cards and other electronic information cards. The application may connect with the Internet such as to timely and automatically update information of the information cards. In implementations, the application card may remind a user associated with the information cards using geographic information systems when the user is close to a physical store associated with the information cards. For example, the application corresponding to an information card may include Google Now, Passbook.

The first application may include an operating system or an application provided by a third party. For example, the first application may include a messaging application, a telephone application, an instant messaging application, a calendar application, a memo application, an email application etc.

The first application may interact with the second application such that the first application transmits an instruction to the second application to instruct the second application to process the information card without switching from the first application to an application corresponding to the information card. This simplifies cross-application information processing and improves flexibility and efficiency of information card processing.

The implementations relate to a method for processing an information card. The first application may receive a triggering event for processing the information card, and the triggering event may be used to instruct processing of the information card. The first application may interact with the second application to process the information card after the first application receives the triggering event and the triggering event is triggered. The triggering event may include instruction information from a user for triggering processing of the information card. The first application receives the instruction information, which is equivalent to receiving the triggering event. For example, a triggering instruction may be generated by a user via the current interface that is presented by the first application. Accordingly, the first application may receive a triggering instruction from a user via the current interface that is presented by the first application.

In implementations, a current interface presented by the first application may include a menu or function keys for the user to generate the triggering event. For example, the user may click on, touch or hover on an operating function menu to call up a corresponding function selection to generate the triggering event. For another example, the user can click on, touch, press or hover on function keys to send a trigger command.

In implementations, the first application may generate an entrance area for the information card in the current interface such that the user may generate a triggering instruction via the entrance area for creating, updating, querying, and/or deleting the information card. For example, a triggering instruction may be generated by a user via the current interface that is presented by the first application. For example, a dedicated triggering button may set on the entrance area such that the user may click the triggering button to trigger a trigger instruction.

Alternatively, the user may press, touch or click the entrance area to send the triggering command. Accordingly, the first application may receive the triggering instruction from the user via the entrance area of the current interface that is presented by the first application.

The triggering event may include a business event triggered by a third application bound to the information card. The first application receives the instruction information, which is equivalent to receiving the triggering event. The third application is different from the first application and the second application, and the third application has business interactions with the first applications.

Supposing that the first application is a SMS application on a user terminal equipment. The third application may be a SMS application on a terminal device of a friend, a family member, a colleague or a stranger.

Supposing that the first application is an instant messaging application on the user terminal equipment (e.g., WeChat client terminal, a QQ client terminal). The third application may be an instant message application on a terminal device of a friend, a family member, a colleague or a strange. In some instances, the third application may be a third party client terminal or a server terminal for instant messaging.

In implementations, the triggering event may be triggered manually by a user and is received by the first application to trigger processing of an information card. In other implementations, the triggering event may be triggered automatically by a third application without user participation. In these instances, a business event triggered by the third application is bound to the information card. Accordingly, once the business event occurs, the information card may be processed.

The first application may be used to monitor the business event triggered by the third application. When the first application detects the business triggered by the third application and determines receipt of the trigger event, the first application may interact with the second application to process the information card.

Supposing that the first application is a SMS application on a user terminal equipment. The third application may be an application that delivers commercial advertisements.

Supposing that the third application is bound to an information card and an operation on the information card. The operation may be performed after the commercial advertisements are received.

Accordingly, the first application may detect the commercial advisements, which is equivalent to determining receipt of the trigger event. The first application may interact with the second application to create the information card.

The first application may receive the triggering event in various ways. The first application may interact with the second application to process the information card after the first application receives the triggering event and the triggering event is triggered.

In implementations, the information card may be processed using various operations such as a creating operation, an updating operation, a querying operation, and/or a deleting operation. The creating operation includes creating a new information card. The updating operation includes updating information of the information card. The querying operation includes querying or searching the information card. The deleting operation includes deleting the information card.

In implementations, the first application may interact with the second application to process the information card. In these instances, the first application may transmit to the second application the instruction to instruct the second application to process the information card.

When the first application may transmit an instruct to the second application to process the information card, the first application may transmit processing information required to process the information card to the second application such that the second application may process the information card when the second application may receive the processing information.

The instruction includes processing information for processing the information card. The second application provides an access interface for external visits to allow other application to call the access interface to process the information card. After triggered by the triggering event, the first application may call the access interface of the second application to allow the first application to transmit to the second application processing information for processing the information card based on the processing information.

In implementations, the first application may acquire the processing information before transmitting the processing information to the second application. In these instances, the first application may receive the triggering event that includes the processing information. For example, when a user sends a triggering command, the triggering command may include the processing information.

When a user sends the triggering command, the first application may present an interface for the user to input the processing information. Accordingly, the first application may determine the processing information based on the triggering event.

In implementations, the first application may receive a triggering event for processing the information card without including the processing information. After triggered by the triggering event, the first application may acquire the processing information and then call the access interface of the second application to allow the first application to transmit to the second application the processing information for processing the information card based on the processing information. In these instances, the first application may determine the processing information based on information presented in the current interface. This approach may be used for a creating operation.

In implementations, the first application may assign a card ID to an information card, and retrieve a card title and card contents from the current interface. Further, the first application may retrieve images and/or links to the images.

Suppose that the first application receives advisement information from the third application and the processing type is a creating operation. The first application may assign a card ID and service ID to the advertisement information and retrieve a card title, card contents such as to obtain processing information for creating an information card based on the advisement information.

In implementations, the processing information includes processing parameters associated with the processing of the information card. The processing information includes a processing type associated with the processing of the information card. The first application may provide the processing type and one or more processing parameters to the second application. Further, the second application may process the information card with respect to the processing type based on the processing parameters.

The processing type is mainly used to identify what needs to process the information card. The processing type is used to identify various operations on the information card such as a creating operation, an updating operation, a querying operation, a deleting operation etc. The processing parameters includes parameters used in one or more operations on the information card that are identified using the processing type.

In general, an application associated with an information card may clearly define a data model of the information card. A data model may include the following data fields:
CID, TEXT//id cards
SID, TEXT//type id
TITLE, TEXT//card title
CONTENT, TEXT//business content
LOGOURL, TEXT//card icon In implementations, the data field may be divided into a basic field, a business field and an extension field. Among them, a business field contains a business content and a business status field, and a extension field includes an expansion with respect to actual business needs. Card ID uniquely identifies an information card for information processing.

Every piece of information corresponds to a service ID for indicating an implementing style of the information card. Information cards having the same service ID have the same implementation style. A card title field is a card title of the information card; a business field is a business field of the information card. A specific format may be defined based on a business part including card contents of the information card. For example, data of a movie information card is shown in Table 1:

TABLE 1

| | |
|---|---|
| card_id | 344656735653656 |
| title | Do not Go Breaking My Heart 2 |
| content | {"PartnerName": "network ticket network", "seatCount": "2", "hall": "Hall 2", "number": "110455400", "seatInfo": "8 row 06 \| 8 row 07 seat ," cinemaName ":" China Film International Studios - Hangzhou Xixi impression of the city shop "," showTime ":" 20: 15: 00 "," showDate ":" 2014 \\ / 11 \\ / 14 "," cinemaPhone ": "0571-88680672", "tip": "1, tickets Location: theater (or theater tickets seller foreground, SMS prevail). |

Table 1 lists a portion of fields of the information card. Depending on a processing type for the information card, processing parameters may be different.

The first application may transmit the processing parameters for creating the information card to the second application by calling an access interface of the second application for external visits. The processing parameters may include the card ID, the card title, the card content, the service ID etc.

The second application may create the information card based on the card ID, the card title, the service ID, and the card content, and return the created information card to the first application. The first application may further display the created information card in a current interface associated with the first application. Users may create the information card without switching from the first application to the second application.

If the processing type of the information card includes an updating operation, the processing parameters may include at least one of a card ID, a card title, a service ID, and a card content. The first application may transmit the processing parameters for transmitting updated processing parameters to the second application by calling an access interface of the second application for external visits. The processing parameters may include the card ID, the card title, the card content, the service ID etc.

The second application may update the information card based on the card ID, the card title, the service ID, and the card content, and return the updated information card to the first application. The first application may further display the updated information card in a current interface associated with the first application. The Users may update the information card without switching from the first application to the second application.

If the processing type of the information card includes a querying operation, the process parameters may include the card ID. The first application may transmit the processing parameters for transmitting the card ID for querying the information card to the second application by calling the access interface of the second application for external visits.

The second application may search an information card corresponding to the card ID, and return the information card to the first application. The first application may further display the information card in a current interface associated with the first application. The users may search and identify the information card without switching from the first application to the second application.

If the processing type of the information card includes a deleting operation, the process parameters may include the card ID. The first application may transmit the processing parameters for transmitting the card ID for deleting the information card to the second application by calling the access interface of the second application for external visits.

The second application may search and identify an information card corresponding to the card ID, and delete the information card. Further, the second application may return a notification message to notify the first application that the information card is successfully deleted. The users may delete the information card without switching from the first application to the second application.

In implementation, the second application provides an access interface for external visits. For various processing types, the first application may call the access interface and transmit the processing type and processing parameters as entrance parameters to the second application. The first application may call one access interface to transmitting information to the second application. This is relatively easier to be implemented and has lower cost as compared to conventional techniques.

In implementations, the second application may provide multiple access interfaces for external visits. Each access interface corresponds to a process type. The multiple access interfaces may include an access interface for creating operations (i.e., a creating access interface), an access interface for querying operations (i.e., a querying access interface), an access interface for updating operations (i.e., a updating access interface), and/or an access interface for deleting operations (i.e., a deleting access interface).

For example, an implementation of the query interface includes: public Cursor query (Uri uri, String [ ] projection, String selection, String [ ] selectionArgs, String sortOrder).

If the first application queries the information card shown in Table 1 above, the first application may use content: //com.yunos.xxx/mycards/{cidXX} to call a query interface.

In these instances, cidXX represents a card ID.

An implementation of updating interfaces may include: public int update (Uri uri, ContentValues values, String selection, String [ ] selectionArgs).

An implementation of adding interfaces may include: public Uri insert (Uri uri, ContentValues values).

Among them, as long as data values are consistent with the data model described above, a new information card may be created successfully.

An implementation of deleting interfaces may include: public int delete (Uri uri, String selection, String [ ] selectionArgs).

The first application may call the access interface corresponding to the processing type of the information card to transmit the processing parameters to the second application such that the second application processes the information card based on the processing parameters. An access interface corresponds to a processing type. Therefore, the first application may call the access interface and transmit the processing type and processing parameters as entrance parameters to the second application. This achieves more flexible and more convenient to operate.

In implementations, the second application may receive the processing parameters from the corresponding access interface of the second application that is called by the first application by implementing the following operations. The first application may call the access interface corresponding to the processing type of the information card to transmit a card ID in the processing parameters to the second application as an entrance parameter.

The second application may receive the processing parameters from the corresponding access interface of the second application that is called by the first application, identify the information card using the card ID, and process the information card using the processing parameters.

The second application may transmit a parameter input interface from the second application to the first application such that the first application may continue to provide with other processing parameters.

The first application may provide other parameters in the processing parameters to the second application via the parameter input interface to allow the second application to process the information card with respect to the processing type based on the card ID and the other parameters.

The second application may receive other parameters in the processing parameters from the first application via the parameter input interface. Alternatively, a user may input processing parameters except for the card ID into the parameter input interface and transmit an instruction to the first application such that the first application may transmit these processing parameters via the parameter input interface to the second application.

The first application may receive processing parameters except for the card ID and transmit these processing parameters via the parameter input interface to the second application. Accordingly, the first application may obtain processing information and provide the processing information to the second application. The second application may further process a corresponding information card based on the processing information that is transmitted from the first application. This approach reduces processing load on the second application.

As described above, the first application may be used to monitor the business event triggered by the third application. The implementations further relate to processing information cards by the second application. In these implementations, the first application instructs the second application to process an information card.

The first application provides a notification message to the second application to process the information card after the first application receives the triggering event and the triggering event is triggered. Accordingly, after receiving the notification message, the second application may acquire form the first application the business event and call a preset processing logic to process the information card.

The second application may receive from the first application the instruction, acquire the preset processing logic, and process the information card based on the processing logic. Accordingly, the second application may receive an instruction including the notification message that is transmitted by the first application after or when the first application receives the business event triggered by the third application bound to the information card.

The notification message instructs the second application to process the information card based on a processing logic corresponding to a predetermined business events. The notification message may be a part of a standard message provided by an operating system; applications supported on the operating system may receive and identify.

The second application may receive and identify the notification message. In some implementations, the information card may be predetermined to be bound to a third application and preset a processing logic corresponding to the information card. Accordingly, after receiving the notification message, the second application may acquire form the first application a business event triggered by the third application and call the preset processing logic to process the information card.

After the first application receives the business event, the first application may broadcast the notification message without obtaining the processing information of the information card and providing the processing information to the second application. This simplifies the processing logic of the first application and reduces processing load on the second application. In these instances, different triggering events associated with the third application correspond to different processing logics for processing different information cards.

The second application may acquire the processing information based on the processing logic and process the information card based on the processing logic. The processing information may include processing parameters associated with the processing of the information card and a processing type. Further, the second application may process the information card based on the processing information, as described above.

For example, suppose that the first application receives an advertising message from the third application. The first application may broadcast a notification message indicating that the first application receives the advertising message. When the second application receives the notification message, the second application may acquire the advertising message.

Suppose that a processing logic is used to create the information card for the advertising message. The second application may process an information card using the processing logic. The second application may assign a card ID and a service ID to the information card, and acquire a card title and a card content from the advertising message.

The second application may create the information card corresponding to the card ID and transmit the created information card to the first application to allow the first application to present the information card in a current interface.

For existing information card, the first application or the second application may acquire the card ID of the information card and then process the information card. This may be implemented by the following methods.

In the first method, when the second application creates a new information card, the second application may broadcast to other clients a message that includes a card ID and service ID. The first application may acquire the card ID and service ID from the message and display a trigger label on the interface associated with the first application. When the user clicks on this label, the first application may display detailed information of the information card (e.g., a card ID).

For the second method, the second application creates a new information card, the second application may store the detailed information to a predetermined directory, for example: /storage/sdcard0/cards.txt. The first application may acquire the detailed information from the predetermined directory.

For the third method, the second application provides detailed information of the query interface such that the first application may query the detailed information via the query interface.

For the fourth method, the second application stores detailed information of the information card in a list that is shared with other clients in a storage space. The first application may read the detailed information from the storage space. The storage space may be shared on a network storage location.

In implementations, the first application interacts with the second application to process the information card. This may be implemented by the following operations. For example, the first application may transmit an instruction to the second application to process the information card. The first application may receive service data from the second application based on the instruction. The first application processes the information card based on the instruction. The service data includes a processing logic for processing the information card.

In implementations, the second application may transmit the processing logic for processing an information card to the first application such that the first application becomes capable of processing the information card and process the information card. In other words, the first application processes the information card based on service data; similarly, the second application processes the information card based on the processing information. These two processes are the same. Accordingly, the flow of processing the information card by the first application based on service data is omitted.

It should be noted that operations may be described as a series of steps. Certain operations may be performed in other orders or simultaneously. Certain operations may not be necessary for implementations of the present disclosure, and certain implementations may be combined with other implementations.

Figure 8:
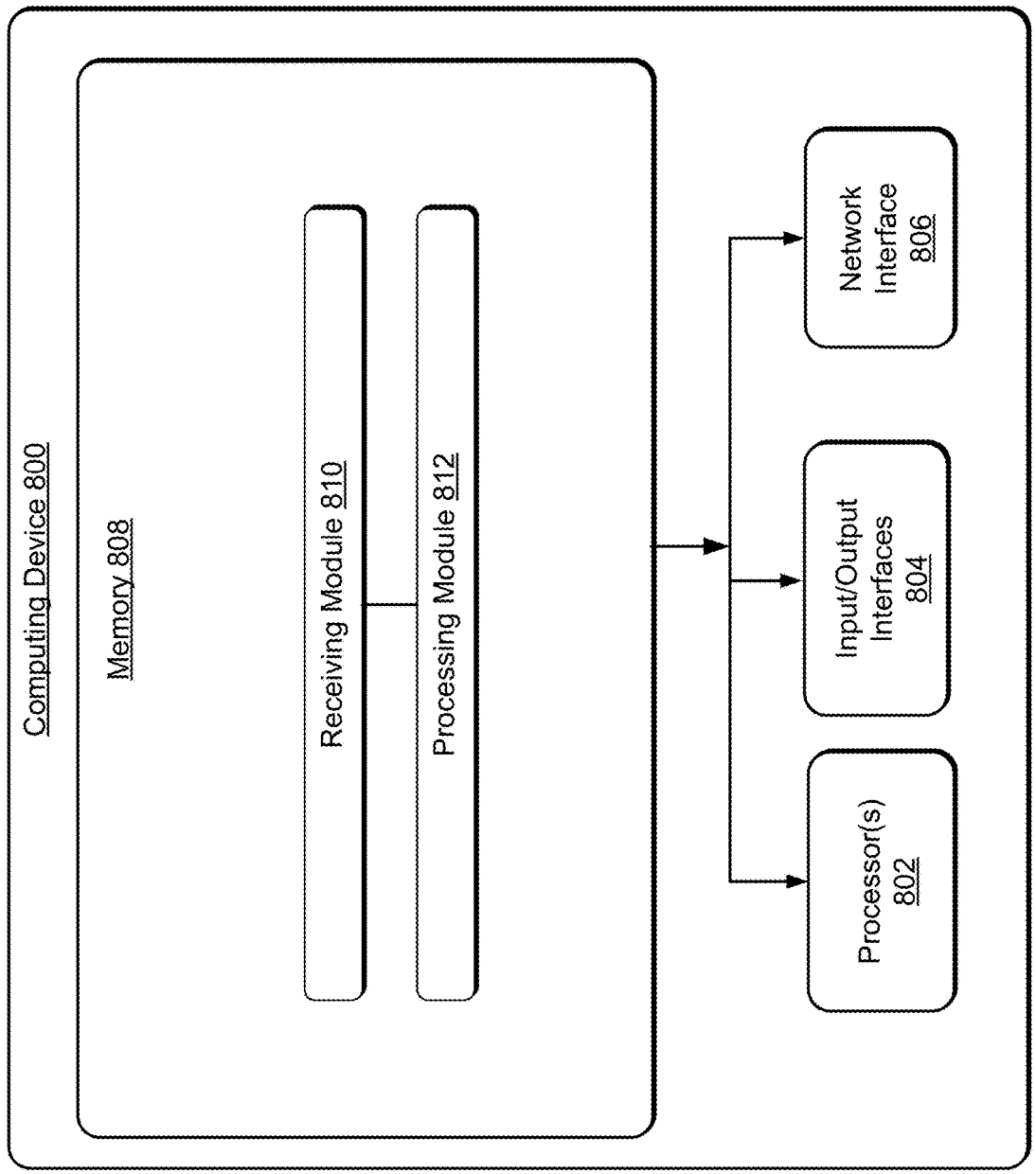
FIG. 8 is a schematic view of a device for processing information cards.

FIG. 8 is a schematic view of a device for processing information cards. The device may be implementations by a second application. In one exemplary configuration, the device 800 includes one or more processors 802, input/output interfaces 804, network interface 806, and memory 808.

The memory 808 may include computer-readable media in the form of volatile memory, such as random-access memory (RAM) and/or non-volatile memory, such as read only memory (ROM) or flash RAM. The memory 808 is an example of computer-readable media.

Computer-readable media includes volatile and non-volatile, removable and non-removable media implemented in any method or technology for storage of information such as computer readable instructions, data structures, program modules, or other data. Examples of computer storage media include, but are not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. As defined herein, computer-readable media does not include transitory media such as modulated data signals and carrier waves.

Turning to the memory 808 in more detail, the memory 808 may include a receiving module 810 and a processing module 812. The receiving module 810 may be configured to receive from a first application an instruction to process an information card. The first application is different from an application corresponding to the information card. The second application is capable of processing the information card.

The processing module 812 may be configured to process the information card based on the instruction, or return service data to the first application based on the instruction received from the receiving module 810 such that the first application may process the information card based on the service data.

In implementations, the instruction includes processing information for processing the information card. The receiving module 810 may be further configured to receive the processing information from an access interface of the second application that is called by the first application. The processing module 812 may be further configured to process the information card based on the processing information. The processing information may include processing parameters associated with the processing of the information card.

The receiving module 810 may be further configured to receive the processing parameters associated with the processing of the information card from the access interface that is called by the first application and corresponds to a processing type of the information card. The receiving module 810 may be further configured to receive a card ID in the processing parameters from the access interface that is called by the first application and corresponds to the processing type of the information card. The second application may transmit a parameter input interface from the second application to the first application.

The second application may receive other parameters in the processing parameters from the first application via the parameter input interface. The processing parameters may include at least one of a card ID, a card title, a service ID, and a card content. The service ID may be used to identify a processing type of the information card.

If the processing type of the information card includes an updating operation, the processing parameters may include at least one of a card ID, a card title, a service ID, and a card content. If the processing type of the information card includes a querying operation, the process parameters may include the card ID. If the processing type of the information card includes a deleting operation, the process parameters may include the card ID.

In implementations, the processing module 812 is further configured to render the card title and the card content based on a type resource corresponding to the service ID to generate an information card view and to create a background view if the processing type of the information card includes creating. The second application may superimpose the information card view on the background view to obtain the information card corresponding to the card ID. The second application may transmit the information card corresponding to the card ID to the first application to allow the first application to present the information card in a current interface or enable displaying of the information card corresponding to the card ID in the current interface of the first application. The background view may be in translucent state.

Accordingly, the second application may receive an instruction including the notification message that is transmitted by the first application after or when the first application receives the business event triggered by the third application bound to the information card. The processing module 812 may be further configured to obtain a processing logic predetermined for the business event based on the notification message, and to obtain the processing information based on the processing logic. The second application may further process the information card based on the processing information. In these instances, the service data may include a processing logic for processing the information card.

The implementations relate to a device for processing information cards. The device may be implemented by the second application. The second application may interact with the first application and receive from the first application the instruction and process the information card based on the instruction. Alternatively, the second application may return service data to the first application based on the instruction received from the receiving module 810 such that the first application may process the information card based on the service data.

The implementations may process the information card under an environment of the first application without switching to the second application, which corresponds to the information card. This improves flexibility and efficiency of information card processing.

Figure 9:
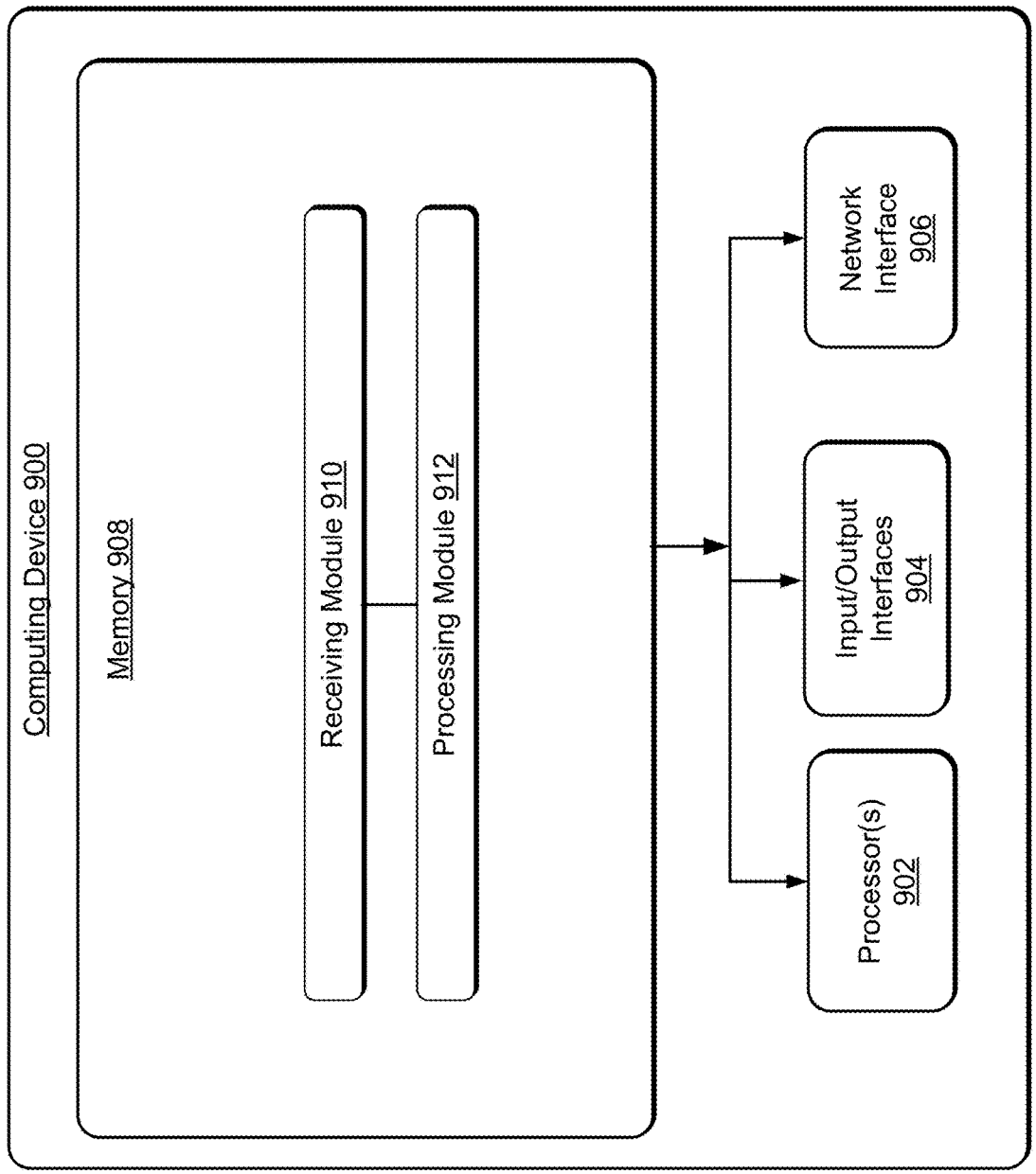
FIG. 9 is another schematic view of a device for processing information cards.

FIG. 9 is another schematic view of a device for processing information cards. The device may be implemented by a first application. In one exemplary configuration, the device 900 includes one or more processors 902, input/output interfaces 904, network interface 906, and memory 908.

The memory 908 may include computer-readable media in the form of volatile memory, such as random-access memory (RAM) and/or non-volatile memory, such as read only memory (ROM) or flash RAM. The memory 808 is an example of computer-readable media.

Computer-readable media includes volatile and non-volatile, removable and non-removable media implemented in any method or technology for storage of information such as computer readable instructions, data structures, program modules, or other data. Examples of computer storage media include, but are not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. As defined herein, computer-readable media does not include transitory media such as modulated data signals and carrier waves.

Turning to the memory 908 in more detail, the memory 908 may include a receiving module 910 and a processing module 912. The receiving module 910 may be configured to receive a triggering event for processing the information card at a first application. The first application is different from an application corresponding to the information card. The processing module 912 is further configured to interact with a second application to process the information card. The second application is capable of processing the information card.

In implementations, the receiving module 910 is further configured to receive a triggering instruction from a user via the current interface that is presented by the first application. The current interface includes an entrance area of the information card. The receiving module 910 may be further configured to receive the triggering instruction from the user via the entrance area.

In implementations, the receiving module 910 is further configured to receive a business event triggered by a third application bound to the information card. In some implementations, the processing module 912 is further configured to transmit the instruction by the second application to process the information card, receive service data from the second application based on the instruction, and process the information card based on the instruction.

In implementations, the processing module 912 is further configured to transmit to the second application the instruction to instruct the second application to process the information card. The instruction includes processing information for processing the information card. Accordingly, the processing module 912 may be further configured to call an access interface of the second application to transmit the processing information to the second application such that the second application processes the information card based on the processing information.

The device may include an acquiring module configured to determine the processing information based on information presented on the current interface of the first application, or configured to determine the processing information based on the triggering event.

In implementations, the instruction includes processing information for processing the information card. Accordingly, the processing module 912 may be further configured to call an access interface corresponding to a processing type of the information card to transmit the processing parameters to the second application such that the second application processes the information card based on the processing parameters.

The processing module 912 may be further configured to call the access interface corresponding to the processing type of the information card to transmit a card ID in the processing parameters to the second application as an entrance parameter, and receive from the second application a parameter input interface.

The first application may provide other parameters in the processing parameters to the second application via the parameter input interface to allow the second application to process the information card with respect to the processing type based on the card ID and the other parameters.

The second application may receive an instruction including the notification message that is transmitted by the first application after or when the first application receives the business event triggered by the third application bound to the information card. Accordingly, after receiving the notification message, the second application may call the preset processing logic to process the information card based on the preset business event.

The processing parameters may include at least one of a card ID, a card title, a service ID, and a card content. The service ID may be used to identify a processing type of the information card. If the processing type of the information card includes an updating operation, the processing parameters may include at least one of a card ID, a card title, a service ID, and a card content. If the processing type of the information card includes a querying operation, the process parameters may include the card ID. If the processing type of the information card includes a deleting operation, the process parameters may include the card ID.

The implementations relate to a device for processing information cards. The device may be implemented by the first application. The first application may interact with the second application and receive the triggering event. After the triggering event is triggered, the first application may interact with the second application and process the information card based on an instruction. The implementations may process the information card under an environment of the first application without switching to the second application, which corresponds to the information card. This improves flexibility and efficiency of information card processing.

Implementations in accordance with the present disclosure may be embodied as an apparatus, method, or computer program product. Accordingly, the present disclosure may take the form of an entirely hardware-included embodiment, an entirely software-included embodiment (including firmware, resident software, micro-code or the like), or an embodiment combining software and hardware aspects that may all generally be referred to herein as a "circuit," "module," or "system." Furthermore, Implementations of the present disclosure may take the form of a computer program product embodied in any tangible medium of expression having computer-usable program code embodied in the medium.

The flow diagrams and block diagrams in the attached figures illustrate the architecture, functionality, and operation of possible implementations of systems, methods, and computer program products according to various Implementations of the present disclosure. In these instances, each block in the flow diagrams or block diagrams may represent a module, segment, or portion of code, which includes one or more executable instructions for implementing the specified logical function(s).

It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks. Although the present disclosure is described in terms of certain Implementations, other Implementations will be apparent to those of ordinary skill in the art, given the benefit of this disclosure, including Implementations that do not provide all of the benefits and features set forth herein, which are also within the scope of this disclosure. It is to be understood that other Implementations may be utilized, without departing from the scope of the present disclosure.

What is claimed is:

1. A method implemented by a computing device, the method comprising: receiving information associated with an information card from a second application, the second application being capable of managing and processing the information card, the second application being operable to use a geographic information system to determine that a user is proximate to a physical location associated with the information card, wherein:
   the information card comprises and displays at least a service ID that indicates a particular implementing style and identifies a processing type of the information card and a card ID that uniquely identifies the information card;
   the particular implementing style comprises a format for displaying a plurality of fields including at least the card ID, a card title, and a card content; and
   the processing type comprises a creating operation, an updating operation, a querying operation, or a deleting operation; and
   information cards having a same service ID have a same implementing style;
sending an instruction to process the information card from a first application located on the computing device to the second application that processes the information card to render the card title and the card content based on a type resource corresponding to the service ID to generate an information card view and a background view and to superimpose the information card view on the background view to obtain the information card corresponding to the card ID, the first application being different from an application that is capable of managing and processing the information card, the instruction including a notification message that is transmitted by the first application after or when the first application receives a triggering event triggered by a third application and bound to the information card;
receiving service data relating to the information card returned by the second application to the first application based on the instruction; and
displaying, at the computing device, the information card at an interface of the first application without switching the interface from the first application to an interface of the second application with the background view in a translucent state.

2. The method of claim 1, wherein:
   the instruction further includes processing information for processing the information card; and
   the sending the instruction to process the information card from the first application located on the computing device to the second application that processes the information card comprises: sending the instruction to the second application through an access interface of the second application that is called by the first application, to allow the second application to process the information card based on the processing information.

3. The method of claim 2, wherein the processing information includes processing parameters associated with the processing of the information card, and the processing type of the information card.

4. The method of claim 1, wherein:
   the processing information includes processing parameters associated with the processing of the information card; and
   the sending the instruction to process the information card from the first application located on the computing device to the second application that processes the information card comprises: receiving at the first application a parameter input interface from the second application; and
      sending one or more parameters in the processing parameters to the second application from the first application via the parameter input interface.

5. The method of claim 1, wherein:
the processing type of the information card includes the creating operation; and
the displaying, at the computing device, the information card at the interface of the first application comprises:
receiving the information card corresponding to the card ID transmitted from the second application to the first application to allow the first application to present the information card in a current interface of the first application; or
presenting the information card corresponding to the card ID in the current interface of the first application by the second application.

6. The method of claim 1,
wherein the method further comprises processing the information card by the second application based on the instruction, the processing comprising:
obtaining a processing logic based on the notification message by the second application, the processing logic predetermined for the business event;
obtaining the processing information by the second application based on the processing logic; and
processing the information card based on the processing information.

7. The method of claim 1, wherein the service data includes a processing logic for processing the information card.

8. The method of claim 1, wherein the third application is different from the first application and the second application, and the third application interacts with the first application.

9. A method implemented by a computing device, the method comprising: sending information associated with an information card from a second application to a first application, the second application being capable of managing and processing the information card, the second application being operable to use a geographic information system to determine that a user is proximate to a physical location associated with the information card, wherein:
the information card comprises and displays at least a service ID that indicates a particular implementing style and identifies a processing type of the information card and a card ID that uniquely identifies the information card;
the particular implementing style comprises a format for displaying a plurality of fields including at least the card ID, a card title, and a card content; and
the processing type comprises a creating operation, an updating operation, a querying operation, or a deleting operation; and
information cards having a same service ID have a same implementing style;
receiving an instruction to process the information card from the first application located on the computing device to the second application that processes the information card to render the card title and the card content based on a type resource corresponding to the service ID to generate an information card view and a background view and to superimpose the information card view on the background view to obtain the information card corresponding to the card ID, the first application being different from an application that is capable of managing and processing the information card, the instruction including a notification message that is transmitted by the first application after or when the first application receives a triggering event triggered by a third application and bound to the information card;
sending service data relating to the information card returned by the second application to the first application based on the instruction; and
causing to display, at the computing device, the information card at an interface of the first application without switching the interface from the first application to an interface of the second application with the background view in a translucent state.

10. The method of claim 9, wherein:
the instruction further includes the processing information for processing the information card; and
the receiving the instruction to process the information card from the first application located on the computing device to the second application that processes the information card comprises: receiving the instruction to the second application through an access interface of the second application that is called by the first application, to allow the second application to process the information card based on the processing information.

11. The method of claim 10, wherein the processing information includes processing parameters associated with the processing of the information card, and the processing type of the information card.

12. The method of claim 9, wherein:
the processing information includes processing parameters associated with the processing of the information card; and
the sending the instruction to process the information card from the first application located on the computing device to the second application that processes the information card comprises:
sending to the first application a parameter input interface from the second application; and receiving one or more parameters in the processing parameters from the first application via the parameter input interface.

13. The method of claim 9, wherein the causing to display, at the computing device, the information card at the interface of the first application comprises:
transmitting the information card corresponding to the card ID from the second application to the first application to allow the first application to present the information card in a current interface of the first application; or
presenting the information card corresponding to the card ID in the current interface of the first application by the second application.

14. A computing device comprising:
one or more processors; and
one or more memories having stored thereon a plurality of computer readable instructions that, when executed by the one or more processors, cause the one or more processors to perform acts comprising:
receiving information associated with an information card from a second application, the second application being capable of managing and processing the information card, the second application being operable to use a geographic information system to determine that a user is proximate to a physical location associated with the information card, wherein:
the information card comprises and displays at least a service ID that indicates a particular implementing style and identifies a processing type of the information card and a card ID that uniquely identifies the information card;

the particular implementing style comprises a format for displaying a plurality of fields including at least the card ID, a card title, and a card content; and the processing type comprises a creating operation, an updating operation, a querying operation, or a deleting operation; and information cards having a same service ID have a same implementing style;

sending an instruction to process the information card from a first application located on the computing device to the second application that processes the information card to render the card title and the card content based on a type resource corresponding to the service ID to generate an information card view and a background view and to superimpose the information card view on the background view to obtain the information card corresponding to the card ID, the first application being different from an application that is capable of managing and processing the information card, the instruction including a notification message that is transmitted by the first application after or when the first application receives a triggering event triggered by a third application and bound to the information card;

receiving service data relating to the information card returned by the second application to the first application based on the instruction; and displaying, at the computing device, the information card at an interface of the first application without switching the interface from the first application to an interface of the second application with the background view in a translucent state.

15. The computing device of claim 14, wherein:
the instruction further includes processing information for processing the information card; and
the sending the instruction to process the information card from the first application located on the computing device to the second application that processes the information card comprises:
sending the instruction to the second application through an access interface of the second application that is called by the first application, to allow the second application to process the information card based on the processing information.

16. The computing device of claim 15, wherein the processing information includes processing parameters associated with the processing of the information card, and the processing type of the information card.

17. The computing device of claim 14, wherein:
the processing information includes processing parameters associated with the processing of the information card; and
the sending the instruction to process the information card from the first application located on the computing device to the second application that processes the information card comprises: receiving at the first application a parameter input interface from the second application; and
sending one or more parameters in the processing parameters to the second application from the first application via the parameter input interface.

18. The computing device of claim 14, wherein:
the processing type of the information card includes the creating operation; and
the displaying, at the computing device, the information card at the interface of the first application comprises:
receiving the information card corresponding to the card ID transmitted from the second application to the first application to allow the first application to present the information card in a current interface of the first application; or
presenting the information card corresponding to the card ID in the current interface of the first application by the second application.

19. The computing device of claim 18, wherein the acts further comprise processing the information card by the second application based on the instruction, the processing comprising:
obtaining a processing logic based on the notification message by the second application, the processing logic predetermined for the business event;
obtaining the processing information by the second application based on the processing logic; and
processing the information card based on the processing information.

20. The computing device of claim 19, wherein the service data includes a processing logic for processing the information card.

* * * * *